(12) United States Patent
Hefty

(10) Patent No.: US 9,288,160 B2
(45) Date of Patent: Mar. 15, 2016

(54) GID CAPABLE SWITCHING IN AN INFINIBAND FABRIC

(75) Inventor: Mark S. Hefty, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/994,154

(22) PCT Filed: Aug. 23, 2011

(86) PCT No.: PCT/US2011/048763
§ 371 (c)(1),
(2), (4) Date: Jun. 14, 2013

(87) PCT Pub. No.: WO2013/028175
PCT Pub. Date: Feb. 28, 2013

(65) Prior Publication Data
US 2013/0259033 A1 Oct. 3, 2013

(51) Int. Cl.
*H04L 12/28* (2006.01)
*H04L 12/947* (2013.01)
*H04L 12/701* (2013.01)

(52) U.S. Cl.
CPC ............... *H04L 49/25* (2013.01); *H04L 45/00* (2013.01)

(58) Field of Classification Search
CPC ....... H04L 45/04; H04L 45/66; H04L 49/351; H04L 12/1886; H04L 12/462
USPC ................... 370/400, 401, 254, 392
See application file for complete search history.

(56) References Cited

U.S. PATENT DOCUMENTS

| | | | |
|---|---|---|---|
| 7,636,772 B1 | 12/2009 | Kirby et al. | |
| 7,697,528 B2 * | 4/2010 | Parry et al. | 370/392 |
| 8,125,928 B2 * | 2/2012 | Mehta et al. | 370/254 |
| 2003/0086421 A1 * | 5/2003 | Awsienko et al. | 370/387 |
| 2004/0205253 A1 * | 10/2004 | Arndt et al. | 710/1 |

(Continued)

FOREIGN PATENT DOCUMENTS

WO 2013/028175 A1 2/2013

OTHER PUBLICATIONS

International Search Report and Written Opinion received for PCT Application No. PCT/US2011/048763, mailed on Apr. 9, 2012, 10 pages.

(Continued)

*Primary Examiner* — Dang Ton
*Assistant Examiner* — Sai Aung
(74) *Attorney, Agent, or Firm* — Law Office of R. Alan Burnett, P.S.

(57) ABSTRACT

Methods, systems, and apparatus for extending the size of Infiniband subnets using GID switching in an Infiniband fabric. An Infiniband subnet is defined to include multiple local identifier (LID) domains, each including multiple nodes interconnected via one or more LID switches. In turn, the LID domains are interconnected via one or more GID switches. Messages may be transferred between nodes in a given LID domain using LID switches in the domain. Messages may be transferred between nodes in separate LID domains by routing the messages via one or more GID switches. In various embodiments, GID switches may be implemented to also operate as LID switches and perform routing based on selected packet header fields.

17 Claims, 5 Drawing Sheets

(56) References Cited

U.S. PATENT DOCUMENTS

| | | | |
|---|---|---|---|
| 2008/0137615 A1* | 6/2008 | Park et al. | 370/332 |
| 2009/0073978 A1 | 3/2009 | Craddock et al. | |
| 2009/0077268 A1* | 3/2009 | Craddock et al. | 709/250 |
| 2010/0165995 A1* | 7/2010 | Mehta et al. | 370/400 |
| 2011/0019678 A1* | 1/2011 | Mehta et al. | 370/401 |

OTHER PUBLICATIONS

International Preliminary Report on Patentability and Written Opinion received for PCT Application No. PCT/US2011/048763, mailed on Mar. 6, 2014, 7 pages.

* cited by examiner

US 9,288,160 B2

GID CAPABLE SWITCHING IN AN INFINIBAND FABRIC

FIELD OF THE INVENTION

The field of invention relates generally to computer system interfaces and, more specifically but not exclusively relates to techniques for enhancing the scalability of an InifiniBand fabric.

BACKGROUND INFORMATION

Progress in computer system development has lead to two inevitable outcomes: ever-faster processing capabilities and ever-larger data storage requirements. To support these features, various data transfer interfaces and associated protocols have been developed. These include interconnects and interfaces that are internal or generally implemented local to a given computer system, such as serial interconnects including Serial ATA, USB (Universal Serial Bus), FireWire, and RapidIO, and PCI Express. External data transfer interconnects and interfaces (targeted for communication both local and remote computing resources) have likewise been developed, including Ethernet, Fibre-Channel, and Synchonous Optical Networks.

An example of a high-speed interface targeted for supporting large and/or distributed data storage in heterogeneous computing environments is InfiniBand. The InfiniBand Architecture (IBA) Specification describes a first order interconnect technology for interconnecting processor nodes and I/O nodes to form a system area network. The architecture is independent of the host operating system (OS) and processor platform. InfiniBand is a switched fabric communications link used in high-performance computing and enterprise data centers. Its features include high throughput, low latency, quality of service and failover, and it is designed to be scalable. The IBA specification defines a connection between processor nodes and high performance I/O nodes such as storage devices.

IBA is designed around a point-to-point, switched I/O fabric, whereby endnode devices (which can range from very inexpensive I/O devices like single chip SCSI or Ethernet adapters to very complex host computers) are interconnected by cascaded switch devices. The physical properties of the IBA interconnect support two predominant environments, with bandwidth, distance and cost optimizations appropriate for these environments:

Module-to-module, as typified by computer systems that support I/O module add-in slots Chassis-to-chassis, as typified by interconnecting computers, external storage systems, and external LAN/WAN access devices (such as switches, hubs, and routers) in a data-center environment.

The availability of high-speed interconnects such as Infiniband has facilitated the use of High-Performance Computer (HPC) clusters to perform computational analysis that was previously reserved to supercomputers. Under the HPC cluster approach, thousands of "commodity" computers and/or servers can be interconnected to perform computational analysis in a massively paralleled architecture. Moreover, HPC cluster implementations are often architected to be highly scalable, leading to the potential use of hundreds of thousands or even millions of interconnected computers and/or processing nodes hosted by one or more computers. However, the current InfiniBand architecture specification limits the size of a single InfiniBand subnet to approximately 48,000 nodes. Accordingly, it would be advantageous to support subnets with greater than 48,000 nodes in a way that is compatible with existing InfiniBand software and hardware.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
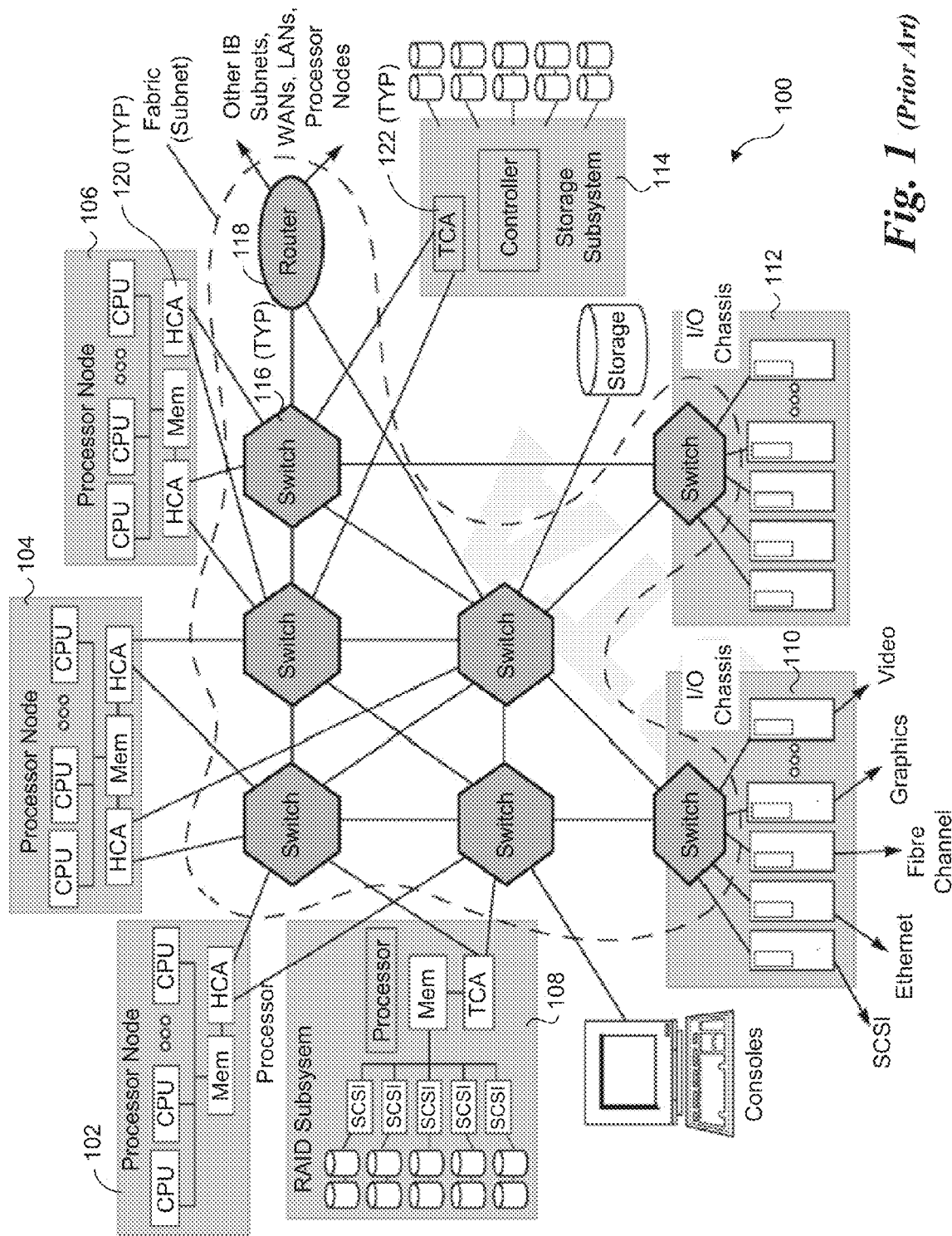
FIG. 1 is a block schematic diagram illustrating a generalized Infiniband System Area Network.

Embodiments of methods, systems, and apparatus for extending the size of Infiniband subnets using GID switching in an Infiniband fabric are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. For example, the labeling of the nodes in various Figures provides information identifying the node and/or its function; such information cannot be conveyed alone with separate reference numbers. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity.

FIG. 1 is a block schematic diagram illustrating a generalized Infiniband System Area Network (SAN) 100. SAN 100 and related aspects are described in detail in the InfiniBand Architecture Specification Volume 1, release 1.2.1 (referred to herein as the current IBA specification), which may be downloaded from the Infiniband Trade Association at www dot infinibandta dot org. The IBA defines a SAN for connecting multiple independent processor platforms (i.e., host processor nodes), I/O platforms, and I/O devices. These are collectively illustrated in FIG. 1 as processor nodes 102, 104, 106, a RAID subsystem 108, I/O chassis 110 and 112, and a storage subsystem 114. The IBA. SAN is a communications and management infrastructure supporting both I/O and interprocessor communications (IPC) for one or more computer systems. An IBA system can range from a small server with one processor and a few I/O devices to a massively parallel supercomputer installation with hundreds of processors and thousands of I/O devices. Furthermore, the interact protocol (IP) friendly nature of IBA allows bridging to an internet, intranet, or connection to remote computer systems.

IBA defines a switched communications fabric allowing many devices to concurrently communicate with high bandwidth and low latency in a protected, remotely managed environment. Communication within an IBA subnet is facilitated by multiple cascaded switches, as depicted by switches 116, while communication between IBA subnets is facilitated by routers, such as depicted by a router 118. An IBA endnode can communicate over multiple IBA ports and can utilize multiple paths through the IBA fabric. The multiplicity of IBA ports and paths through the network are exploited for both fault tolerance and increased data transfer bandwidth.

Each of the interconnected nodes in an IBA SAN provides an InfiniBand Channel Adapter interface. Processor Nodes employ a Host Channel Adaptor (HCA) interface, such as depicted by HCA interfaces 120. I/O nodes implement a Target Channel Adaptor (TCA) interface, such as depicted by TCA interfaces 122.

Communication between nodes as facilitated by a messaging protocol that is agnostic to the physical transport layer. The messaging portal is designed to support both existing and future interconnect links and protocols, and accordingly, does not specify details of the physical layer of the links. Accordingly, IBA communications may be implemented using a variety of different physical interconnect architectures and protocols.

Standard IBA message addresses use two types of node identifiers: LIDs, or Local Identifiers, and GID, or Global Identifiers. LIDs are local within a subnet (that is all LIDs within a given subnet are unique, but nodes in separate subnets may employ the same LID). Conversely, all GIDs are unique. Each IBA endnode includes one or more HCA or TCA ports. In turn, each port includes one or more GIDs per port, and one or more LIDs per port. In addition, each HCA, TCA, switch, and router is assigned a EUI-64 GUID by its manufacturer. Each LID is a 16-bit layer-2 address, while each GID is a 128-bit layer-3 address.

The LID 16-bit layer-2 addresses are used for packet routing within an IBA subnet. Approximately 48,000 addresses from the LID address space may be assigned to endnodes, per the current IBA specification. However, there is a growing desire to connect more that 48,000 nodes to a single IBA subnet to support larger applications.

In further detail, the LID address space is defined as follows:
 LID 0x0000 is reserved.
 LID 0xFFFF is defined as a permissive DLID. The permissive DLID indicates that the packet is destined for QP0 on the endport which received it.
 The unicast LID range is a flat identifier space defined as 0x0001 to 0xBFF.
 The multicast LID range is a flat identifier space defined as 0xC000 to 0xFFFE.

In accordance with aspects of the embodiments disclosed herein, a subnet switching scheme is defined that operates on the IBA layer-3 GID addressing. Under the scheme, a subnet manager divides a subnet into multiple LID domains, with each LID domain being assigned one or more LIDs. Within a domain, nodes are assigned LIDs as defined by the current IRA specification; however, a LID may be assigned to multiple nodes as long as the nodes reside in different LID domains and the LID is not assigned to a domain (itself). GID capable switches are then employed to connect LID domains. A GID capable switch is compliant with the existing IBA switching standard, but performs two additional operations. It translates between LIDs and GIDs, and can forward packets based on GID addresses.

Figure 2:
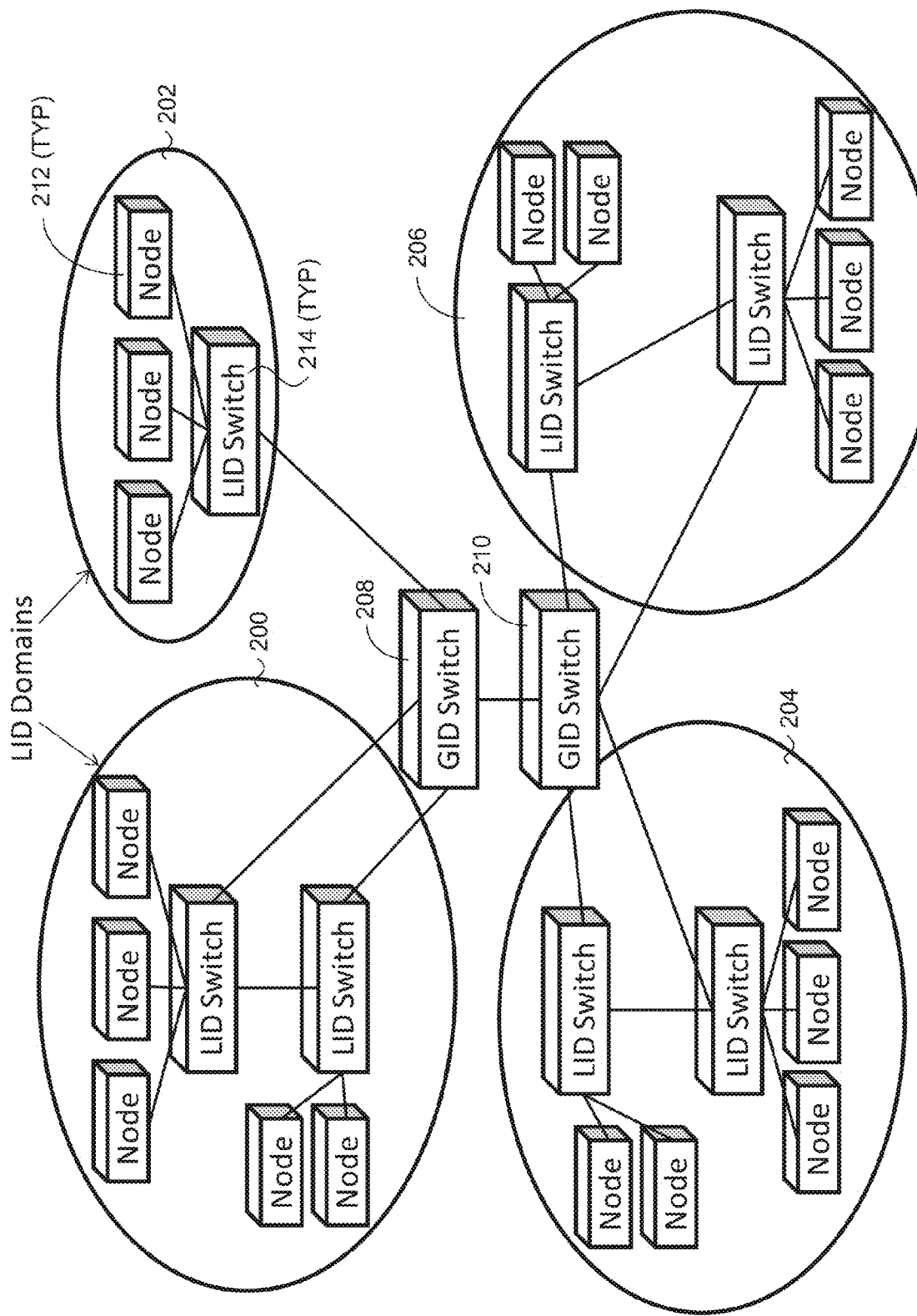
FIG. 2 shows a generalized view an Infiniband subnet comprising multiple LID domains interconnected via a pair of GID switches.
Figure 2A:
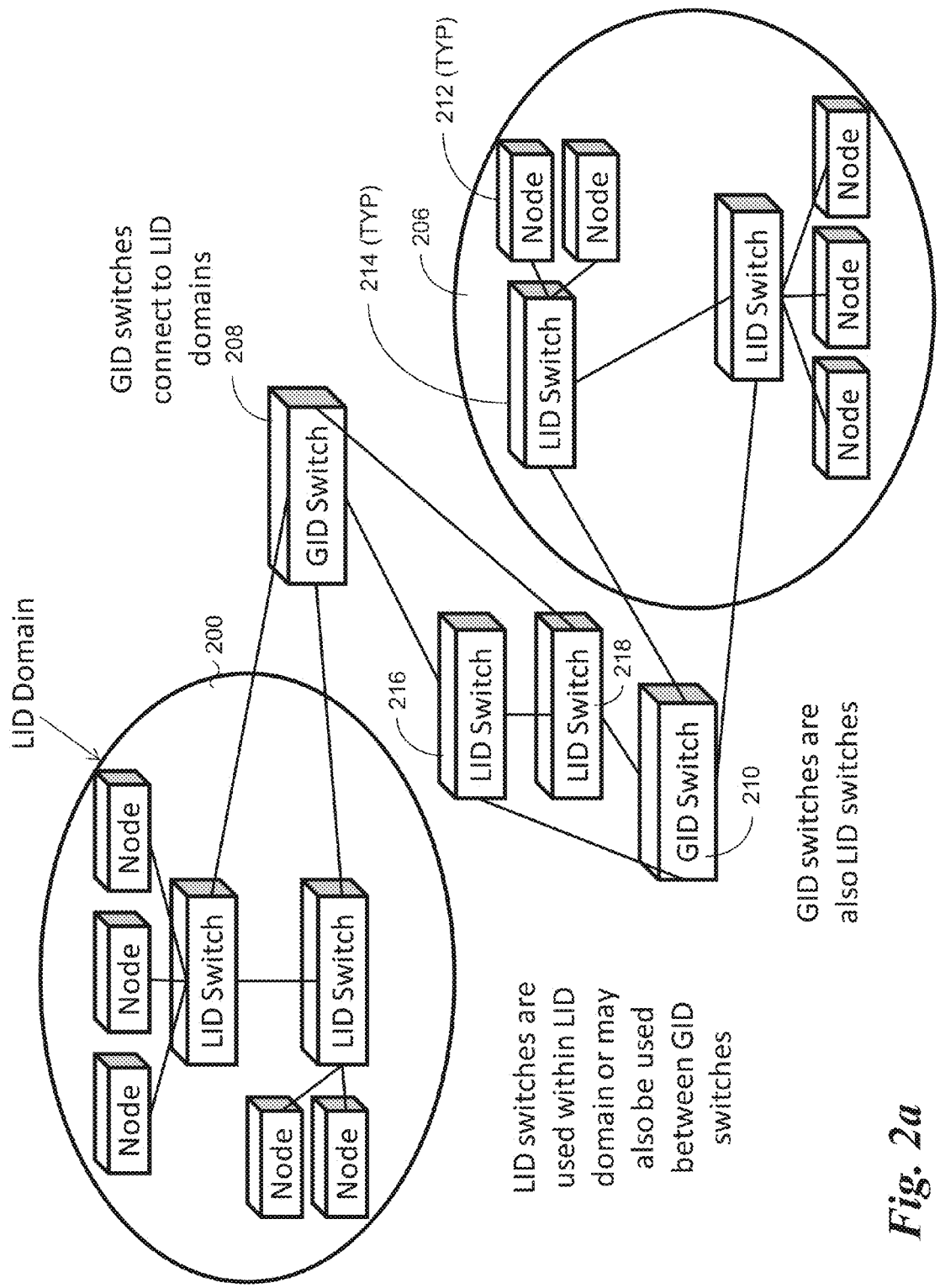
FIG. 2a shows an alternative configuration of the Infiniband subnet of FIG. 2 further including a pair of LID switches between GID switches.

FIG. 2 shows a generalized view an Infiniband subnet comprising multiple LID domains 200, 202, 204, and 206 interconnected via a pair of GID switches 208 and 210. Each LID includes multiple nodes 212 connected to one or more LID switches 214. FIG. 2a shows an alternative configuration in which LID switches 216 and 218 are used between GID switches 208 and 210.

The IB subnet administrator (SA) programs all switches within a LID domain as defined by the current IBA specification. That is, routing within an LID domain is based on LIDs, which work with all current switches and NICs (Network Interface Cards). Routing between domains may be programmed to use either LID or GID addressing. Unlike Infiniband routers, GID-based switching does not act on other fields in the layer-3 header (global router header or GRH). In most cases LID-based routing is used except when a packet enters a destination LID domain from another LID domain (e.g., cross-domain routing is required).

Figure 3:
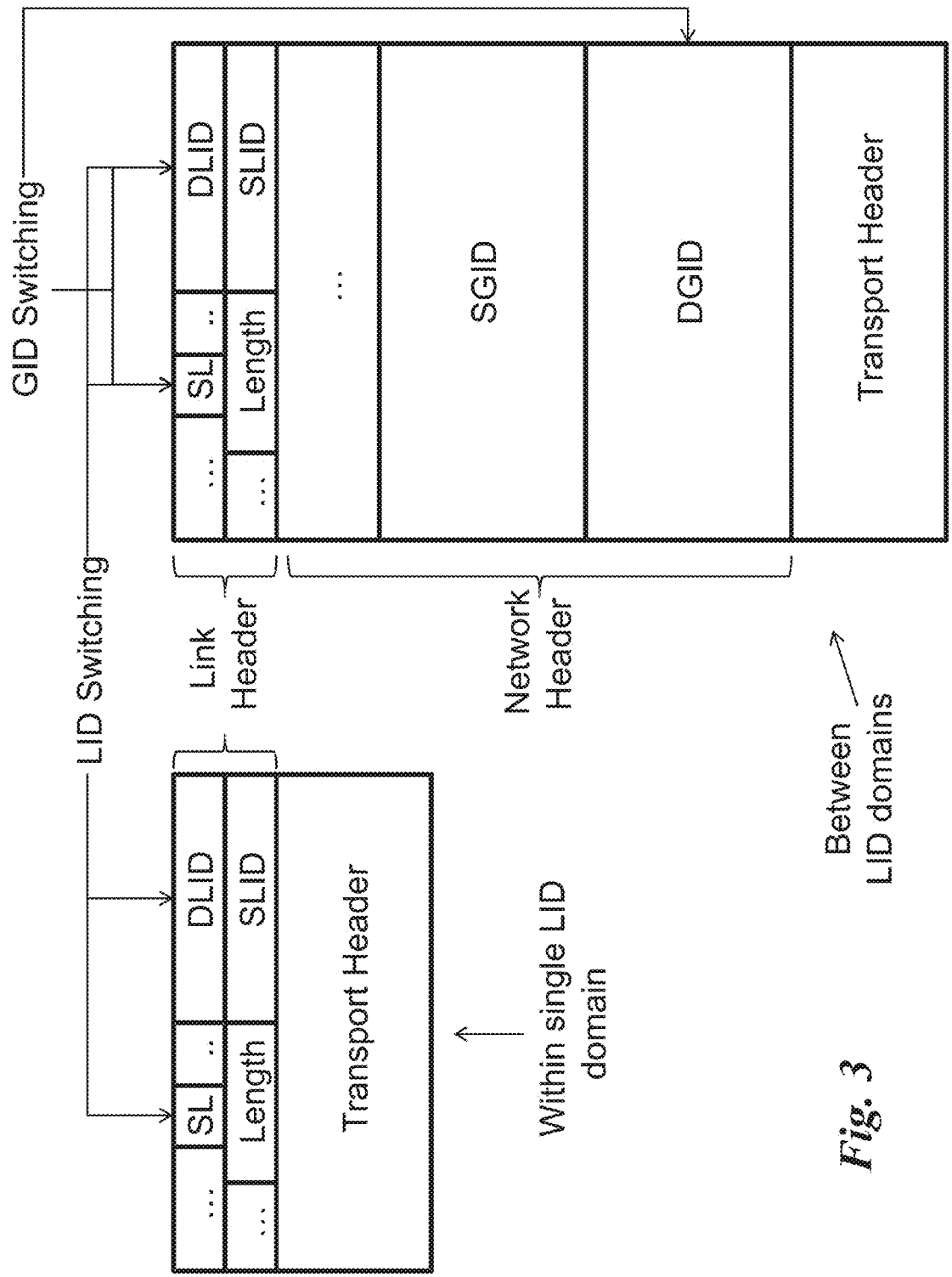
FIG. 3 is a block diagram illustrating selective packet header fields used for effecting LID switching and GID switching in accordance with one embodiment.

FIG. 3 shows selected packet header format information to support LID switching and GID switching according to one embodiment. For clarity, only selected fields are shown—details of Infiniband packet header structures and header fields that are not shown can be found in the current IBA specification. The two fields used for LID switching include the DLID (Destination LID) and the SL (Service Level) values (which is optional in one embodiment), with the primary routing based on the DLID. When GID Switching is employed, the relevant fields are DLID, SL (optional in one embodiment), and DGID (Destination GID) fields.

Figure 4:
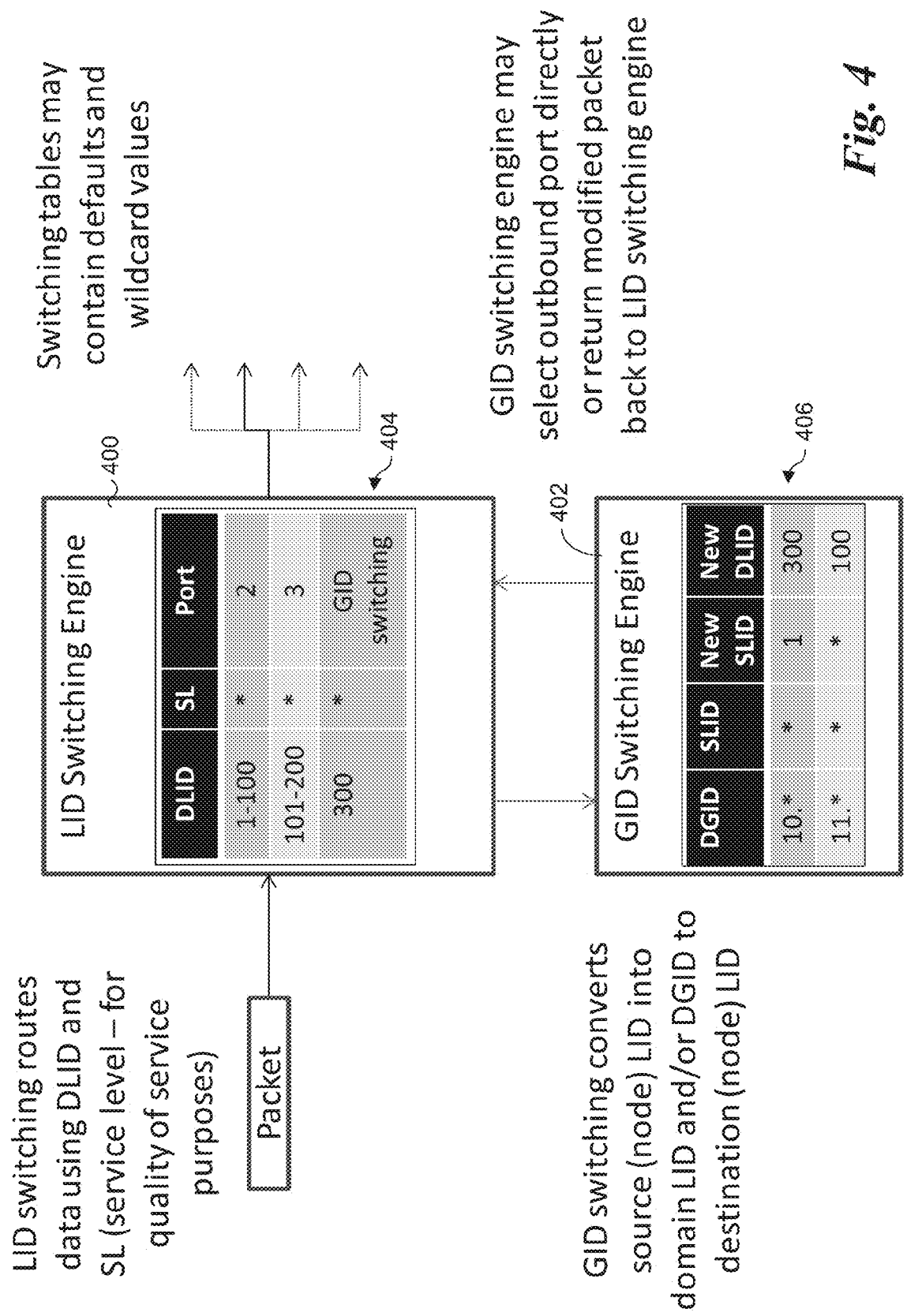
FIG. 4 is a block diagram illustrating an LID switching engine and a GID switching engine with respective LID and GID switch routing tables.

FIG. 4 shows an LID switching engine 400 and a GID switching engine 402 including respective portions of an exemplary LID switch routing table 404 and an exemplary GID switch routing table 406. In one embodiment, each LID switch employs a LID switching engine 400 including a routing table similar to LID switch routing table 505. In one embodiment, a GID switch employs both a LID switching engine 400 and a GID switching engine 402 including a routing table similar to GID switch routing table 406.

The LID Switching engine routing table 404 shows three entries with corresponding DLID ranges and/or values. In the illustrated example the SL values are depicted by a * indicating the value does not matter. However, in LID switch implementations that effect routing based on service level there may be other entries in routing table 404 defining how corresponding packets are to be routed. The values in the first row indicate that DLID values of 1-100 are assigned to a port 2, while DLID values of 101-200 are assigned to a port 3 and a DLID value of 300 identifies GID switching is to be employed at the destination switch.

The GID switching engine routing table 406 is used to map source (node) LID (SLID) address values into domain LID and/or DGID to destination (node) LID values. The GID switching engine routing table 404 depicts two entries. Under the first entry, DGID addresses beginning with "10." are assigned a new SLID value of 1 and a new DLID value of 300. Under the second entry, messages with a DGIG address beginning with "11." maintain the same SLID and are assigned a new DLID of 100. In general, the GID switching engine may select an outbound port directly (e.g., by adding a port field to switching engine routing table 406 (not shown)) or it may return a modified packet (e.g., a packet with a new DLID) back to LID switching engine 400 for further route processing.

When a GID capable switch forwards a packet with a DLID that corresponds to an adjacent LID (i.e., the LID is one hop away, either in an adjacent LID domain or external to all LID domains), it examines the GRH, extracts the destination GID, and compares that against the GID routing table to determine the outbound port and final destination LID based on corresponding matched parameters ((i.e., field values) in an applicable row in the table.

The GID to LID translation provides compatibility with existing software and hardware. GID-based switches convert source and destination LIDs when entering or leaving an associated LID domain. The GID capable switch attached to the source LID domain of a packet replaces the packet's source LID, which matches the LID of the source port, with the LID assigned to the source LID domain. In a similar fashion, the GID capable switch connected to the destination LID domain replaces the destination LID, which matches the destination LID domain, with the LID assigned to the actual destination GID.

In general, the operations of the LID and GID switches described herein may be implemented via corresponding embedded logic using hardware-based logic, software-based logic, or a combination of the two Moreover, software-based logic may be implemented using corresponding instructions executable on general-purpose and/or special purpose processors, or may be comprise instructions executable by a virtual machine running on a host computing device. These instructions may reside in a non-volatile storage medium on the LID or GID switch (e.g., in a Read-only Memory, in Flash memory or other solid state storage device, or on a disk drive or optical drive), or be downloaded over a network and stored during run-time operations in memory. Generally, hardware-based logic may be implemented via ASICs, programmed logic arrays, FPGA's, and other embedded logic circuitry as would be recognized by those skilled in the associated arts.

Aspects of the embodiments disclosed herein may be implemented as a computer program product and/or related software components that may include one or more machine-readable mediums having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, instructions for effecting operations discussed herein may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An Infiniband subnet, comprising:
    a plurality of Infiniband Local Identifier (LID) domains, each LID domain including a plurality of nodes interconnected in communication with other nodes in the LID domain via at least one LID switch; and
    at least one Infiniband Global Identifier (GID) switch, each GID switch connected in communication with at least one LID switch in each of at least two LID domains,
    wherein the LID switches and each GID switch is configured to route messages between the plurality of nodes such that communications between nodes within a LID domain employ at least one LID switch and communications between nodes in different LID domains employ at least two LID switches and at least one GID switch; and
    wherein each of the GID switches employs a GID switch routing table having a plurality of fields including a Destination GID (DGID) field and a new Destination LID (DLID) field, wherein packets are routed via a GID switch by inspecting a packet DGID and assigning a new DLID address to the packet based on a corresponding entry in the GID switch routing table and routing the packet to a corresponding port defined for a routing table entry having a DGID value or DGID range corresponding to the packet DGID.

2. The InfiniBand subnet of claim 1, wherein each of the LID switches employs an LID switch routing table having a plurality of fields including a Destination LID (DLID) field and a port field, wherein packets are routed via a LID switch by inspecting a packet DLID and routing the packet to a corresponding port defined by a routing table entry having a DLID value or DLID range corresponding to the packet DLID.

3. The InfiniBand subnet of claim 2, wherein at least one LID switch routing table is configured such that at least one packet DLID value indicates the packet is to be routed via a GID switch.

4. The InfiniBand subnet of claim 1, wherein the GID switch routing table further includes a new Source LID (SLID) field, wherein an SLID address for a packet received at a GID switch is updated with a new SLID address based on a corresponding entry in the GID switch routing table having values matching corresponding field values in a packet header for the packet.

5. The InfiniBand subnet of claim 1, wherein a GID switch further includes an LID switch routing table having a plurality of fields including a Destination LID (DLID) field and a port field, wherein packets are routed via a GID switch having a GID switch routing table by inspecting a packet DLID and routing the packet to a corresponding port defined for a LID routing table entry having a DLID value or DLID range corresponding to the packet DLID or routing the packet through further use of the GID switch routing table if the LID routing table entry has a DLID value indicating GID switching is to be performed.

6. The InfiniBand subnet of claim 1, wherein a GID switch is configured to support GID switching and LID switching functions.

7. The InfiniBand subnet of claim 1, wherein the LID switches enable routing of packets within a LID domain using 16-bit level-2 addresses.

8. A Global Identifier (GID) switch, comprising:
one or more processing elements;
memory;
packet routing logic, stored in the memory, comprising instructions configured to be executed on at least one of the one or more processing elements to enable the GID switch to perform GID switching operations when implemented in an InfiniBand subnet including a plurality of Local Identifier (LID) domains, each LID domain including a plurality of nodes interconnected in communication with other nodes in the LID domain via at least one LID switch;
first and second ports configured to support routing of packets between the GID switch and first and second LID switches; and
a GID switch routing table having a plurality of fields including a Destination GID (DGID) field and a new Destination LID (DLID) field, wherein packets originating from a first LID domain and destined for a second LID domain are routed via the GID switch by inspecting a packet DGID and assigning a new DLID address to the packet based on a corresponding entry in the GID switch routing table and routing the packet to a corresponding port defined for a routing table entry having a DGID value or DGID range corresponding to the packet DGID.

9. The GID switch of claim 8, further comprising:
packet routing logic operable to enable the GID switch to perform LID switching operations in connection with routing packets between the GID switch and an LID switch.

10. The GID switch of claim 8, wherein the GID switch routing table further includes a new Source LID (SLID) field, wherein an SLID address field for a packet received at the GID switch is updated with a new SLID address based on a corresponding entry in the GID switch routing table having values matching corresponding field values in a packet header for the packet.

11. The GID switch of claim 8, wherein the GID switch further includes an LID switch routing table having a plurality of fields including a Destination LID (DLID) field and a port field, wherein packets are routed via the GID switch by inspecting a packet DLID and routing the packet to a corresponding port defined for a LID switch routing table entry having a DLID value or DLID range corresponding to the packet DLID or routing the packet through further use of the GID switch routing table if the LID routing table entry has a DLID value indicating GID switching is to be performed.

12. The GID switch of claim 8, wherein the GID switch further comprises packet routing logic operable to enable the GID switch to perform LID switching operations.

13. The GID switch of claim 12, wherein the LID switching operations support routing of packets between the GID switch and a LID switch using 16-bit level-2 addresses.

14. A method comprising:
implementing an InfiniBand subnet comprising a plurality of local identifier (LID) domains linked in communication via at least one global identifier (GID switch), each LID domain including a plurality of nodes interconnected in communication via at least one LID switch;
routing messages between nodes within a given LID domain using at least one LID switch implemented in that domain; and
routing messages between nodes in first and second LID domains using a respective LID switch in each of the first and second LID domains and at least one GID switch located outside of the first and second LID domains,
wherein each GID switch employs a GID switch routing table having a plurality of fields including a Destination GID (DGID) field and a new Destination LID (DLID) field, wherein packets are routed via a GID switch by inspecting a packet DGID and assigning a new DLID address to the packet based on a corresponding entry in the GID switch routing table and routing the packet to a corresponding port defined for a routing table entry having a DGID value or DGID range corresponding to the packet DGID.

15. The method of claim 14, further comprising routing messages between nodes in the same LID domain using a 16-bit layer 2 addressing scheme.

16. The method of claim 14, further comprising implementing at least one GID switch to operate as both a GID switch and a LID switch.

17. The method of claim 14, further comprising effecting routing of packets via a GID using an LID switch routing table and a GID switch routing table.

* * * * *